Nov. 14, 1972

HANS-GEORG HENGELHAUPT ET AL 3,702,652

DEVICE TO CAST OFF WOUND RIBBON FROM A SPOOL

Filed Nov. 9, 1970

INVENTORS
HANS-GEORG HENGELHAUPT
FRIEDRICH TEICHMANN

BY *Joseph R. Spalla*

ATTORNEY

United States Patent Office 3,702,652
Patented Nov. 14, 1972

3,702,652
DEVICE TO CAST OFF WOUND RIBBON FROM A SPOOL
Hans-Georg Hengelhaupt, Nuremberg, and Friedrich Teichmann, Feucht, Germany, assignors to Triumph Werke Nuernberg A.G., Nuremberg, Germany
Filed Nov. 9, 1970, Ser. No. 87,960
Claims priority, application Germany, Dec. 31, 1969, P 19 65 751.3
Int. Cl. B41j *33/14;* B65h *75/18*
U.S. Cl. 197—151            10 Claims

ABSTRACT OF THE DISCLOSURE

A ribbon spool that has two axially separable ribbon spool components, each with a spool hub portion facing the other, has a manipulative device associated therewith whereby the ribbon spool components are movable from joined to separated relations for discharging used, wound-up ribbon from between the spool hub portions. The device is normally in a spool-locating position on a typewriter and is removable therefrom and manipulative for casting off wound, used ribbon from the spool.

---

Figure 1:
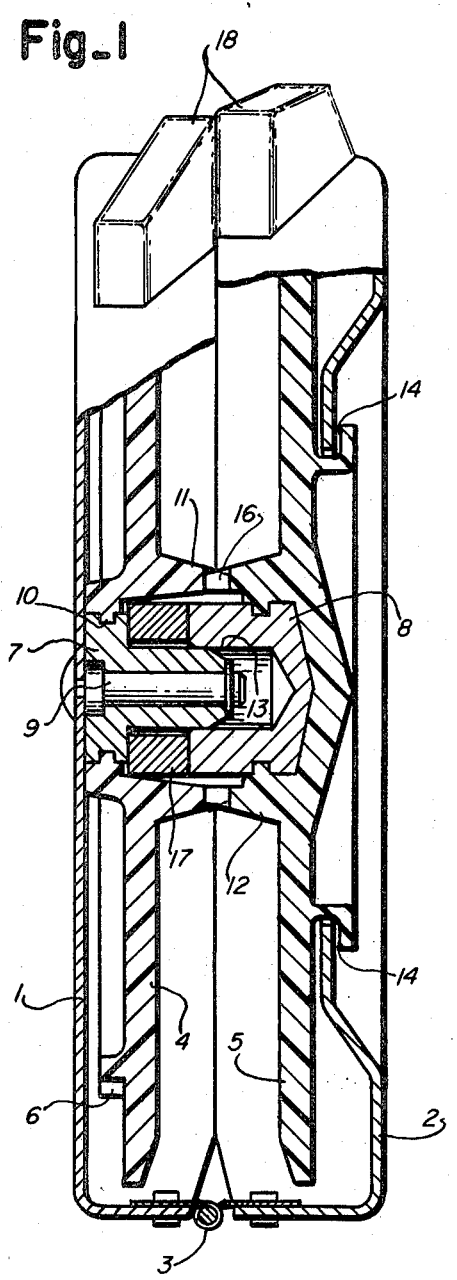

This invention relates to a cassette in a typewriter or similar machine for turnably supporting a power-driven spool turnably carried within the cassette, the cassette and the spool being adapted to be opened.

In power driven typewriters and other machines, color or carbon coated ribbons of paper or plastic material, are more and more extensively used, because they are conducive to making better typing impressions. In order to facilitate removal of wound ribbon from the take-up spool it must be possible to dismember the spool, namely the spool must comprise two separable disks which have a hub extending therebetween and whereon the ribbon is wound. In ribbon winding devices of this kind, the take-up spool is supported either on a fixed or a swingable bracket. In such kinds of constructions, when a ribbon change is to be effected, one disk or part of the take-up spool is removed, while the other disk, inclusive possibly of the spool hub and a drive gear for such part, remains in the machine. Then the removal of the ribbon from the hub entails a further manipulation.

In another known structure the take-up spool is contained in a cassette which is supported on the machine frame and is withdrawable therefrom. When a ribbon change is to be effected, the cassette containing the used carbon ribbon is first removed from the machine, then the spool flanges are separated and finally the ribbon is removed from the spool hub.

In such structural arrangements for the take-up spool, the removal of the spool, its dismemberment and the removal of the used ribbon is cumbersome.

The interconnection of the spool disks for instance by detenting spring elements, entails awkward manipula-tions against considerable resistance. Then when assembling the spools again the spool disks must be accurately centered in respect to each other and relatively long guides to effect parallelism of the spool disks are required.

The plastic carbon coated ribbon when being wound on the spool is subject to some stretching strain and consequently bears with some pressure on the spool hub so that it becomes difficult to remove the wound ribbon from the spool hub.

It is an object of the invention to provide a composite spool for a carbon ribbon consisting of two separable spool disk components and further to provide a handling device or cassette therefore in a form which facilitates the temporary separation of the spool disk components for effecting the discharge of the wound ribbon, the handling device or cassette subsequently being manipulated to facilitate the reconstitution of the spool disk components in their normal correlation so that they are centered in respect to each other and the disks thereof are parellel. As the spool disks components are separated the used ribbon automatically becomes discharged.

The object of the invention is more specifically attained by that a power rotatable ribbon take-up spool comprises two spaced spool disks with hub portions facing toward each other, which spool disks with hub portions are rotatively carried on related side walls which are parts of a spool holder or cassette and are connected together by a hinge structure for effecting the separations of said walls and consequently the separations of the spool disks. In order to permit the disposal of the ribbon from the spool with ease, the spool hub portions on the spool disks are tapered with the smaller diameter ends facing toward each other. Therefor, when the spool disks are separated by spreading said walls of the handling device, the wound ribbon falls automatically from between the disks.

In order to connect rotatively the spool disks, the smaller diameter ends of their hubs are provided with teeth of saw-tooth form so arranged that a positive drive connection is established between the disks in the ribbon winding direction, said spool disks inclusive their hubs and the cassette walls upon being moved together being held in closed spool condition by a magnet. Thereby, as the cassette is closed in any relative rotative positions the drive to the spool disks is established with minimal lost motion.

Figure 3:
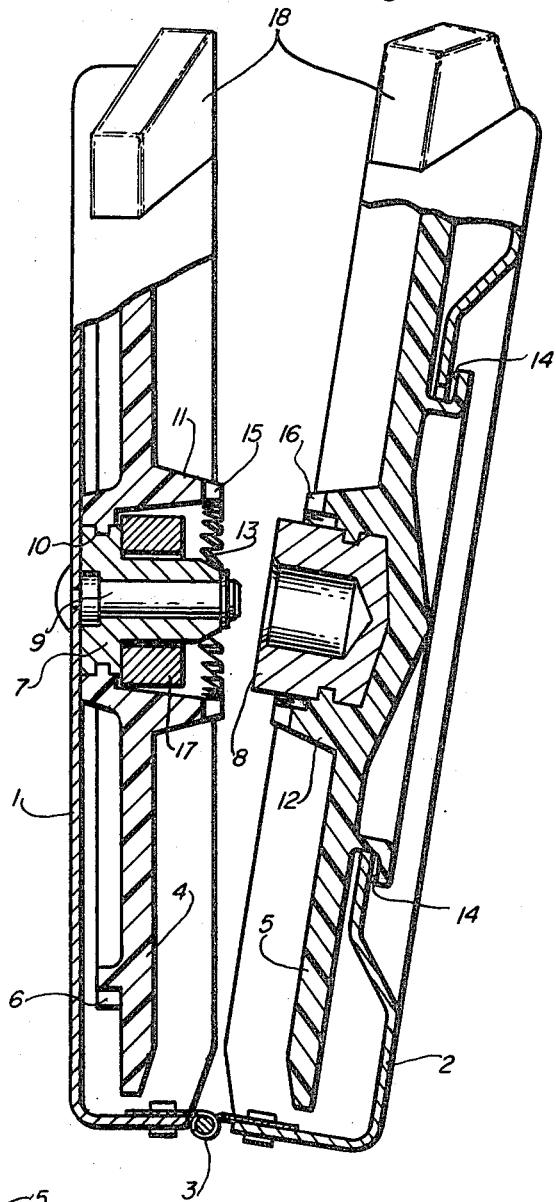
Figure 2:
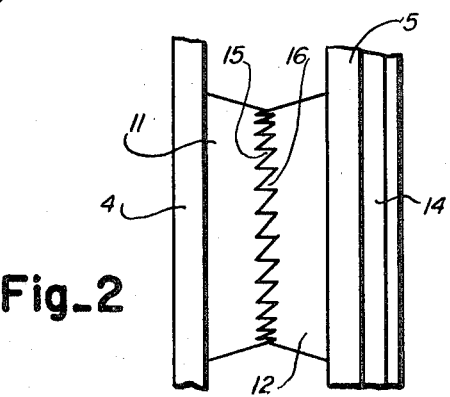

Having now reference to the drawings:

FIG. 1 is a cross sectional view of the ribbon spool and cassette therefor in a closed state condition, FIG. 2 is a fragmentary elevational view of ribbon spool hubs interassociated by teeth of saw-tooth form, and FIG. 3 is a cross sectional view similar to FIG. 1 showing the spool and the cassette in an open state.

The cassette comprises two spaced walls 1 and 2 which are interconnected by a hinge 3 so that the cassette can be opened by spreading the two walls. The cassette walls 1 and 2 give rotative support respectively to the spool disks 4 and 5. The spool disk 4 embodies a gear ring 6 by which it is adapted to receive ribbon winding motion, and has a central bushing 7 whereby it is turnably carried on a stud 9 which is projecting inwardly from the wall 1. Said bushing is contiguous to the cassette wall 1 united at 10 with a tapered spool hub 11 which is an integral part of the spool disk 4, the bushing 7 being tapered as at 13. The spool disk 5 has a large hollow iron bushing 8 on its inner side, and at its axial outer side has a circular radially outwardly facing groove 14 constituting a large-play bearing association with a hole in the cassette wall 2, the hollow iron bushing 8 in the closed condition of the cassette having a locating fit in the bushing 7 belonging to the other spool disk 4. The spool disk 5 has at the inner central portion a hub portion 12 which complements the hub portion 11 of the disk 4. The reduced-diameter ends of the tapered hub portions 11, 12 have circular rows of teeth 15, 16 of saw-tooth form facing and interfitting each other in a manner to provide normally a positive drive connection from the disk 4 to the disk 5 in a spool driving direction. In the circular space around the bushing 7 within the inner side of the hub portion 11 there is situated a permanent magnet 17 of the ring form. This magnet 17, by magnetic attraction of the iron bushing 8 is effective in the closed positions of the cassette 1, 2 to hold the two spool components comprising the disks 4, 5 separately together, the groove 14 in the spool disk 5, due to its large play association in the hole of cassette wall, allowing freely the alignment of the spool components through the bushings 7 and 8.

In order to facilitate handling of the cassette 1, 2 for lifting it from or introducing it to the machine, and opening and closing it, the cassette parts 1 and 2 have each a handle 18 at locations opposite to the hinge 3. When operative, the cassette stands placed in closed condition in the machine. When wound up ribbon on the composite spool 4, 5 is to be disposed therefrom, the cassette 1, 2 is withdrawn upwardly out of the machine frame work and is opened by the handles 18 over a waste basket, so that the opposite cassette walls 1 and 2 and the hub portions 11 and 12 separate and the latter face the waste basket, and whereby the tapered hub portions 11, 12 facilitate then readily the casting or dropping off of the wound ribbon therefrom. This having been done, the cassette 1, 2 is closed without regard to the relative positions of the saw-teeth 15, 16 on the inner ends of the hubs 11, 12 inasmuch as the form and number of teeth readily allows the closure of the cassette 1, 2 and spool disks 4, 5 regardless of the prevalent rotative positions of such disks. Through the attractive power of the magnet 17 and the suitable back sides of the saw-teeth 15, 16, the spool disks 4, 5, become cammed relatively to each other to effect functionally correct and solid engagement. Thereafter, the closed cassette 1, 2 is reinserted into operative position on the machine frame work, whereafter the leading end of a new carbon ribbon can be threaded onto the closed composite spool 4, 5.

As opposed to well known prior devices for discharging carbon ribbon from spools, the device of the present invention provides that by opening of a cassette 1, 2, used, wound up carbon ribbon on the tapered spool hub portions 11, 12 readily frees itself therefrom, so that without the operator touching the ribbon, such ribbon is cast off the hub portions. Another simplification in the handling process resides therein that as the cassette 1, 2 is being closed, the action of the magnet 17 and the shape of the bushings 7, 8 in the hubs will effectively provide for the automatic centering and alignment of the spool disks. The efficient manner of manipulation of the device is facilitated by employment of simple, low-cost structural parts.

The invention claimed is:

1. A ribbon cassette arrangement comprising:
   a composite spool structure for winding a ribbon thereon,
   a handling device for rotatably supporting said composite spool structure for winding movement,
   said composite ribbon spool structure comprising two spool disks normally in a spaced-apart and axially aligned position and hub-forming means comprising on at least one of said disks a hub-forming portion extending toward the other disk,
   said handling device comprising two members each associated with a different one of said spool disks and connecting means for interconnecting said members and enabling said members to move from each other about the interconnection,
   said spool disks each being movable with said associated members of said handling device, and
   said members being movable from each other about the interconnection of said connecting means to effect the relative separation of the two spool disks from their normal axially aligned position to facilitate the removal of a wound-up ribbon from said hub-forming means.

2. In a ribbon cassette arrangement as defined in claim 1, said connecting means comprising a hinged structure connecting said members for effecting the separation of the spool disks from their normal axially aligned position.

3. In a ribbon cassette arrangement as defined in claim 1, said hub-forming means comprising on each of said disks a hub-forming portion extending toward the other disk when said hubs are normally axially aligned, and said hub-forming portions being reduced in dimension toward each other for facilitating the removal of a wound ribbon therefrom when the spool disks are separated.

4. In a ribbon cassette arrangement as defined in claim 3, said hub-forming portions having teeth which interengage each other when the spool disks are in the normal spaced-apart and axially aligned position.

5. In a ribbon cassette arrangement as defined in claim 4, said teeth being of saw-tooth form so that rotational movement of one spool disk in a ribbon winding direction positively drives said other spool disk.

6. In a ribbon cassette arrangement as defined in claim 1,
   one of said spool disks being rotatably supported about an axis carried by said associated member of said handling device and the other of said disks being supported by said other member for movement laterally to the axis of said disk,
   and the ribbon cassette arrangement further comprising aligning means for axially aligning said spool disks upon movement of said spool disks to the normal spaced-apart position, and said aligning means being carried on each of said spool disks for cooperable engagement as said spool disks move together to guide said laterally movable disk into concentric alignment with the other spool disk.

7. In a ribbon cassette arrangement as defined in claim 6, said aligning means including a tapered member concentrically associated with one spool disk and another member having an opening formed therein for receiving said tapered member and being concentrically carried by said other spool disk, whereby said spool disks are axially aligned by said tapered member being received in the opening of said other member as said spool disks are moved into the normal spaced-apart position.

8. In a ribbon cassette arrangement as defined in claim 6, the arrangement further comprising holding means associated with said spool disks to hold said spool disks together when they are moved to their normal axially aligned position.

9. In a ribbon cassette arrangement as defined in claim 1, the arrangement further comprising: a permanent magnet associated with one of said hub-forming means, and another member magnetically attractable to said magnet and associated with the other hub-forming means, whereby said permanent magnet and said magnetically attractable element normally hold said composite spool disks and hub-forming means separably together.

10. In a ribbon cassette arrangement as defined in claim 1, said handling device comprising a multiple part-cassette of which one part is one of said members and the other part is said other member.

References Cited

UNITED STATES PATENTS 3,432,021   3/1969   Morelli _____ 242—71.8 X

FOREIGN PATENTS 449,061   4/1968   Germany _____ 242—71.8

STANLEY N. GILREATH, Primary Examiner

G. A. WALTERS, Assistant Examiner

U.S. Cl. X.R.

197—175; 242—71.8